United States Patent
Ghorbani et al.

(10) Patent No.: US 10,457,849 B2
(45) Date of Patent: Oct. 29, 2019

(54) METHOD FOR CONTROLLING SCALE FORMATION

(71) Applicant: Statoil Petroleum AS, Stavanger (NO)

(72) Inventors: Nasser Ghorbani, Bergen (NO); Tore Tjomsland, Blomsterdalen (NO); Arnd Wilhelms, Fanå (NO)

(73) Assignee: STATOIL PETROLEUM AS, Stavanger (NO)

( * ) Notice: Subject to any disclaimer, the term of this patent is extended or adjusted under 35 U.S.C. 154(b) by 60 days.

(21) Appl. No.: 15/112,029

(22) PCT Filed: Jan. 16, 2014

(86) PCT No.: PCT/IB2014/058335
§ 371 (c)(1),
(2) Date: Jul. 15, 2016

(87) PCT Pub. No.: WO2015/107391
PCT Pub. Date: Jul. 23, 2015

(65) Prior Publication Data
US 2016/0333250 A1 Nov. 17, 2016

(51) Int. Cl.
| C09K 8/528 | (2006.01) |
| E21B 37/06 | (2006.01) |
| E21B 33/12 | (2006.01) |
| E21B 34/06 | (2006.01) |
| E21B 43/34 | (2006.01) |

(52) U.S. Cl.
CPC .............. *C09K 8/528* (2013.01); *E21B 33/12* (2013.01); *E21B 34/06* (2013.01); *E21B 37/06* (2013.01); *E21B 43/34* (2013.01); *C09K 2208/10* (2013.01)

(58) Field of Classification Search
CPC ...................................................... C09K 8/06
See application file for complete search history.

(56) References Cited

U.S. PATENT DOCUMENTS

| 3,974,039 A | 8/1976 | Fröhner et al. | |
| 4,713,177 A * | 12/1987 | Atwood et al. | ........... C02F 5/04 |
| | | | 210/697 |
| 6,365,101 B1 * | 4/2002 | Nguyen et al. | ......... C23F 11/06 |
| | | | 422/13 |

(Continued)

FOREIGN PATENT DOCUMENTS

| WO | WO 2009/149024 A1 | 12/2009 |
| WO | WO 2012/129302 A2 | 9/2012 |

OTHER PUBLICATIONS

International Search Report issued in PCT/IB2014/058335, dated Aug. 11. 2014.

(Continued)

*Primary Examiner* — Angela M DiTrani Leff
*Assistant Examiner* — Avi T Skaist
(74) *Attorney, Agent, or Firm* — Birch, Stewart, Kolasch & Birch, LLP

(57) ABSTRACT

The present invention provides, a method of controlling scale formation in a hydrocarbon producing system, comprising; (i) injecting nanoparticles into said system to function as nuclei for scale growth; (if) allowing scale growth to occur on said nanoparticles to produce nanoparticles comprising scale; and. (in) optionally recovering said nanoparticles comprising scale.

15 Claims, 2 Drawing Sheets

(56) References Cited

U.S. PATENT DOCUMENTS

2011/0089115 A1* 4/2011 Lu .......................... C23F 14/02
210/683

OTHER PUBLICATIONS

Written Opinion of the International Searching Authority issued in PCT/IB2014/058335, dated Aug. 11. 2014.
International Preliminary Report on Patentability and Written Opinion of the International Searching Authority (PCT/IB/373 and PCT/ISA/237) dated Jul. 28, 2016 for Application No. PCT/IB2014/058335.

* cited by examiner

METHOD FOR CONTROLLING SCALE FORMATION

FIELD OF THE INVENTION

The present invention relates to a method of controlling scale formation in a hydrocarbon producing system comprising injecting nanoparticles into the system to function as nuclei for scale growth. The invention also relates to the use of nanoparticles as nuclei for scale growth in a method of controlling scale and to a system for hydrocarbon production comprising a chemical deployment system for injecting nanoparticles into a well and a means for separating nanoparticles comprising scale from production fluids.

BACKGROUND

During the operation of many hydrocarbon wells (i.e. a gas or oil well), the deposition of scale on the formation walls and on production tubing and equipment in contact with well fluids can occur. The severity of the problem is highly dependent on the field operating conditions, which can vary from mild scaling tendencies to the extreme. In the North Sea, typical scales are inorganic salts such as $BaSO_4$, $SrSO_4$, $CaSO_4$ and $CaCO_3$. These salts precipitate as scale when the saturation level of the fluid in which they are present is exceeded. This is clearly detrimental to the operation of the well and the production equipment.

There are two main approaches to preventing or reducing scale formation in hydrocarbon producing systems, namely squeeze treatment and downhole chemical injection (DHCI). Both of these treatment methods involve injection of a scale inhibitor into the hydrocarbon producing system. A major difficulty in preventing scale formation in hydrocarbon producing systems is that they are "open" systems and as such it is a challenge to retain the scale inhibitor within the system, i.e. to prevent it flowing out of the system along with production fluids.

DHCI is most often used to protect the upper part of wells and tubing as well as the downhole safety valve that has scaling potential above the production packer. DHCI is usually used instead of squeeze treatment when a well does not have a high scaling potential in the near wellbore or in cases where scale squeezing would be difficult or costly to perform, e.g. because of tie-in subsea fields.

In a DHCI operation scale inhibitor is injected continuously into the well via a chemical injection line. The injection point is usually upstream of the downhole safety valve. This facilitates dispersion of the scale inhibitor into the production fluids being pumped back to the production platform or refinery facilities via the downhole safety valve.

A wide range of different types of scale inhibitors are of course available. Generally the mechanism by which scale inhibition occurs is the same. It involves the scale inhibitor adsorbing to a scale nuclei or scale crystal in order to prevent its further growth. Whilst adsorbed on the surface, further crystal growth is impeded. The overall effect of scale inhibitors is therefore to slow down the rate of crystal growth. However, even at concentrations above the identified minimum inhibitor concentration (MIC) complete protection from scale precipitation will not be obtained.

DHCI has been used for a number of years and has been successful in many fields. On the other hand, however, DHCI has failed in a number of other fields. This is discussed in some detail in SPE article 154967 (Hustad, B. M., et al., Aberdeen 30-31 May 2012). Problems that have been encountered during DHCI include:

- Significant scale growth in long flowlines due to long residence times and variations in temperature
- Scale blockage of the chemical injection line and/or downhole safety valve
- Gunking or plugging in gas lift operations due to the evaporation of solvent causing precipitation of solid scale inhibitor in the injection system
- Corrosion of production equipment due to the acidity of certain scale inhibitors in combination with downhole conditions, especially high temperatures
- Scale inhibitor freezing during transportation, especially in long flowlines Accordingly there is a need for an alternative, more efficient, method for controlling scale formation in a hydrocarbon producing system. Methods which are able to control scale formation when long (e.g. up to 50 km) flowlines are in use and/or wherein the flowlines encounter a wide range of temperature conditions are particularly desired.

SUMMARY OF INVENTION

Thus viewed from a first aspect the present invention provides a method of controlling scale formation in a hydrocarbon producing system, comprising:
(i) injecting nanoparticles into said system to function as nuclei for scale growth;
(ii) allowing scale growth to occur on said nanoparticles to produce nanoparticles comprising scale; and
(iii) optionally recovering said nanoparticles comprising scale.

Viewed from a further aspect the present invention provides use of nanoparticles as nuclei for scale growth in a method of controlling scale formation in a hydrocarbon producing system.

Viewed from a further aspect the present invention provides use of nanoparticles in the manufacture of a composition for a method of controlling scale formation in a hydrocarbon producing system, wherein said nanoparticles function as nuclei for scale growth.

Viewed from a further aspect the present invention provides a system for producing hydrocarbon comprising:
(i) a hydrocarbon producing formation comprising a production well;
(ii) a chemical deployment system (e.g. an Injection line) for injecting nanoparticles into said production well;
(iii) tubing for transporting production fluid and nanoparticles comprising scale out of said production well; and
(iv) a means for separating nanoparticles comprising scale from production fluids having an inlet connected to said tubing and having a first outlet for nanoparticles comprising scale and a second outlet for production fluid.

DEFINITIONS

As used herein the term "scale" is intended to encompass any inorganic precipitate which may be formed within a hydrocarbon (i.e. oil or gas) producing system. In hydrocarbon producing systems, typical examples of scale include sulphate and carbonate salts of group I and group II metals, e.g. $BaSO_4$, $SrSO_4$, $CaSO_4$, $CaCO_3$ and mixtures thereof.

As used herein the term "hydrocarbon producing system" encompasses the hydrocarbon producing formation (e.g. rock) from which hydrocarbon is extracted as well as the hydrocarbon producing equipment used in the extraction process.

As used herein the term "hydrocarbon producing formation" refers to a subterranean formation comprising hydrocarbon that can be extracted.

As used herein the term "hydrocarbon producing equipment" refers to the equipment used to extract or produce hydrocarbon. This equipment includes both subsurface and surface equipment, e.g. tubes, pipes, pumps, valves, nozzles, storage containers, screens, etc.

As used herein the term "production fluid" refers to the mixture of hydrocarbon and water that is produced or extracted from a hydrocarbon producing system.

As used herein the term "nanoparticle" refers to a particle that has one or more dimension of 100 nm or less.

As used herein the term "nuclei" is used to refer to a surface or scaffold that scale crystals can grow on.

DESCRIPTION OF INVENTION

The method of the present invention for controlling scale formation in a hydrocarbon producing system preferably prevents or reduces scale formation on the hydrocarbon producing equipment present therein. Particularly preferably the method of the present invention prevents or reduces scale formation on downhole and subsea hydrocarbon producing equipment. This includes, for example, the downhole safety valve and the tubing or flowline returning production fluid to the production platform or refinery. Particularly preferably the method of the invention prevents or reduces scale formation on the downhole safety valve.

Preferably the method of the present invention also prevents or reduces scale damage to the hydrocarbon producing formation. Thus preferably the method of the present invention prevents or reduces deposition of scale on the formation walls and/or in pores in the formation.

The method of the present invention comprises injecting nanoparticles into the hydrocarbon producing system to function as nuclei for scale growth, and allowing scale growth to occur on the nanoparticles to produce nanoparticles comprising scale. This reduces the concentration of Ions which form scale (i.e. scale forming ions) present in production fluids, e.g. in the produced water. The use of nanoparticles is critical in the method of the present invention for at least two reasons. First the total surface area provided by the nanoparticles is vast which means that the total surface area provided for scale crystals to grow on is vast. This means that scale growth is much more likely to occur on nanoparticles than on the formation or the production equipment. Second the size of the nanoparticles means that neither the nanoparticles per se nor nanoparticles comprising scale cause any blockages in the hydrocarbon producing system.

In preferred methods of the present invention the nanoparticles have at least one dimension which is on average (either mean, median or mode) 1 to 100 nm, more preferably 2 to 50 nm and still more preferably 3 to 20 nm, e.g. 5 to 10 nm.

In further preferred methods of the present invention, the nanoparticles are cylindrical or tube shaped. Particularly preferably nanotube particles are used. In this case the diameter of the nanotubes is preferably on average (either mean, median or mode) 1 to 100 nm, more preferably 2 to 50 nm and still more preferably 3 to 20 nm, e.g. 5 to 10 nm. Further preferred nanotube particles have an average length (either mean, median or mode) of 20 to 2000 nm, more preferably 100 to 1000 nm and still more preferably 300 to 500 nm. The ratio of the nanotube average diameter to average length is preferably in the range 1:500, more preferably 1:200 and still more preferably 20:60.

In the methods of the present invention the nanoparticles, e.g. nanotube particles, preferably have a specific surface area of 100 to 5000 $m^2/g$, more preferably 200 to 1000 $m^2/g$ and still more preferably 300 to 700 $m^2/g$. The specific surface area values are preferably determined by gas adsorption analysis.

In the methods of the present invention the nanoparticles, e.g. nanotube particles, preferably have a purity of 80 to 100% and more preferably 90 to 95%.

Preferably the nanoparticles, e.g. nanotube particles, used in the method of the present invention comprise carbon. Still more preferably the nanoparticles, e.g. nanotube particles, consist essentially of (e.g. consist of) carbon. In particularly preferred methods of the invention the nanoparticles, e.g. nanotube particles, are functionalised with a polar group. Representative examples of preferred polar groups include carboxylic acid (—COOH), sulphonic acid (—$SO_3H$), phosphoric acid (—$OPO_3H_2$), hydroxyl (—OH), sulphate (—$OSO_3H_2$) and salts thereof. Nanoparticles functionalised with a polar group are preferred for two reasons. First the polar group helps the nanoparticles to disperse in production fluid and second the polar group attracts scaling ions to the nanoparticle surface.

The carbon nanotube particles may be single-walled, double-walled, or multi walled or any combination of these. Preferably, however, the carbon nanotube particles are multiwalled.

As set out above, the function of the nanoparticles in the method of the present invention is to act as nuclei for scale growth. The Idea of the method of the present invention is that scale growth occurs on the nanoparticles rather than on the hydrocarbon producing system, i.e. the formation and equipment present therein. The nanoparticles are used sacrificially.

Usually in scale formation the formation of nuclei is the rate determining step. In the method of the present invention, however, by supplying nuclei in the form of nanoparticles, scale crystal growth can begin straightaway on the nanoparticle surface. Combined with the fact that the nanoparticles provide a vast total surface area for crystal growth, this means that scale growth occurs far more preferentially on the nanoparticles than on the hydrocarbon producing system.

Significantly, however, because the number of nanoparticles provided is high, the scale growth is distributed over a large number of particles. As a result the average size of nanoparticles comprising scale is not significantly greater than the nanoparticles per se. This means that the nanoparticles comprising scale do not impede fluid flow through the hydrocarbon producing system.

Preferably the nanoparticles comprising scale are less than 500%, more preferably less than 100% and still more preferably less than 50% greater in size (e.g. based on average diameter) than the nanoparticles per se. Preferably the nanoparticles comprising scale have at least one dimension which is on average (either mean, median or mode) 10 to 1000 nm, more preferably 15 to 700 nm and still more preferably 20 to 500 nm. In another dimension (e.g. length), the nanoparticles comprising scale may be on average (either mean, median or mode) 100 to 50,000 nm, more preferably 200 to 5000 nm and still more preferably 300 to 800 nm Preferably the nanoparticles comprising scale have an average diameter that is smaller than the diameter of the downhole safety valve.

Suitable nanoparticles, e.g. suitable carbon nanotubes, for use in the present invention are commercially available.

The effect of scale crystal growth on the nanoparticles is to reduce the concentration of scale forming ions in the production fluids.

In preferred methods of the invention the amount of nanoparticles injected into the system is sufficient to reduce the concentration of scale forming ions present in production fluids to close to or below the saturation limit. Preferably the concentration of scale forming ions present in production fluids is reduced to below the saturation limits within 1 minute to 60 minutes, more preferably 2 minutes to 30 minutes and still more preferably 3 minutes to 20 minutes of injecting the nanoparticles into the system. Preferably the amount of nanoparticles injected into the system is sufficient to reduce the concentration of $Ba^{2+}$ in the production fluids to below 100 ppm, more preferably to below 10 ppm. Preferably the amount of nanoparticles injected into the system is sufficient to reduce the concentration of $Sr^{2+}$ in the production fluids to below 100 ppm, more preferably to below 10 ppm. Preferably the amount of nanoparticles injected into the system is sufficient to reduce the concentration of $SO_4^{2-}$ in the production fluids to below 10 ppm, more preferably to below 1 ppm. Preferably the amount of nanoparticles injected into the system is sufficient to reduce the concentration of $Ca^{2+}$ and $CO_3^{2-}$ in the production fluids to below the saturation limits respectively.

The scale forming ions present in the production fluid are in equilibrium with solid salt (i.e. scale). This is shown below wherein $M^{2=}$ is a cation which forms scale, $A^{2-}$ is an anion which forms scale and MA is scale.

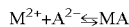

$$M^{2+}+A^{2-}\leftrightarrows MA$$

In the absence of nanoparticles, when the concentration of MA exceeds the solubility limit of the production fluid, scale forms therein. The nucleation is typically the rate determining process of scale precipitation. Hence, if a scale crystal is present at, for example, the pipe or tubing wall, it is likely that precipitation will occur at the existing crystal rather than in the liquid phase.

In the presence of the nanoparticles, scale crystal growth preferentially occurs on their surface due to their large number and vast collective surface area. As a result the concentration of each of $M^{2+}$, $A^{2-}$ and MA salt in the production fluids is significantly lower. Thus equilibrium is reached and the concentration of MA is at or below the saturation limit of the production fluid. This means that the production fluid comprising nanoparticles comprising scale is stable and can be pumped a long distance without significant risk of further scale formation, e.g. at the surface of the producing system. Particularly preferably nanoparticles are injected continuously into the system. This ensures that stability in the production fluid is continuously maintained. Alternatively the nanoparticles may be injected intermittently.

The nanoparticles for use in the method of the invention are preferably applied as a composition. The composition is preferably a solution or dispersion, and more preferably a dispersion, of nanoparticles in a liquid carrier. The liquid carrier may be aqueous or non-aqueous. Suitable non-aqueous carriers include alkanols, particularly polyols (e.g. a glycol). Particularly preferred glycols include those of the formula $(CH_2)_n(OH)_2$ wherein n is 2 to 6 (e.g. ethylene glycol). Alternatively the liquid carrier may be aqueous (e.g. sea water).

When the liquid carrier is aqueous, it is preferred that the solution or dispersion of nanoparticles in carrier liquid has a pH of about 7. Preferably the pH is 5 to 8. This reduces the risk of the method of the invention causing any corrosion of hydrocarbon producing equipment.

The concentration of the nanoparticles in the carrier liquid will be an amount effective to control scale formation as described above and will be readily determined by those skilled in the art. Typically, however, the nanoparticles will be present in the liquid carrier at a concentration of 0.5 to 50% wt, preferably 1 to 45% wt and more preferably 2.5 to 40% wt.

The composition may also contain other additives known in the art for use in well treatment. Such additives include surfactants, thickeners, diversion agents, corrosion inhibitors, pH buffers, catalysts and other scale inhibitors. Particularly preferably the composition comprises a surfactant. The presence of a surfactant helps to disperse the nanoparticles in the production fluid. Preferably the composition does not comprise a conventional scale inhibitor. Particularly preferably the composition consists essentially of (e.g. consists of) nanoparticles, liquid carrier and optionally a surfactant.

The amount of composition used to control scale formation will vary widely depending on factors such as the nature of the nanoparticles used, the nature of the formation (e.g. the levels of Ba, Sr and Ca present) and so on. The appropriate amount of nanoparticles will be readily determined by those skilled in the art.

In preferred methods of the present invention the hydrocarbon producing system comprises a hydrocarbon producing formation. Preferably the hydrocarbon producing system comprises a production well. The production well may be any shape or size. Preferably production fluid is recovered via tubing (e.g. a flowline) in the production well. The nanoparticles are preferably injected via said production well.

Preferably the nanoparticles are injected via a chemical deployment system or chemical injection system, e.g. an injection line. Preferably the chemical deployment system or chemical injection system is attached (e.g. clamped) to the outside of tubing (e.g. production tubing) in the production well. Preferably the chemical deployment system or chemical injection system terminates in a chemical injection valve. The chemical injection valve may be downstream (i.e. above) or upstream (i.e. below) the production packer but is preferably downstream. The downhole safety valve is preferably downstream (i.e. above) the production packer. The downhole safety valve is preferably downstream (i.e. above) the chemical injection valve. In one preferred system the production packer and the chemical injection valve are located in the lower completion and the downhole safety valve is located in the upper completion. In another preferred system, the production packer is located in the lower completion and the chemical injection valve and downhole safety valve are located in the upper completion. Preferably the injection line injects the nanoparticles upstream (i.e. below) the downhole safety valve and still more preferably in the lower completion. Injection equipment conventionally used for downhole chemical injection may be employed.

Preferably the nanoparticles comprising scale are recovered via the production well. Preferably the production fluid and nanoparticles comprising scale are recovered via tubing. Preferably the tubing connects a downhole safety valve to a production platform or refinery. In preferred methods of the invention the tubing is 2-50 km in length, more preferably 5 to 45 km in length and still more preferably 10 to 40 km in length. In particularly preferred methods of the Invention the tubing experiences a temperature variation of at least 80°

C. and more preferably at least 160° C. along its length (e.g. a variation of 50 to 200° C. along its length). The method of the present invention is particularly advantageous when such tubing is employed because the nanoparticles remove enough ions that form scale from the production fluids to achieve a stable equilibrium in the production fluid wherein the concentration of scale salt is well below the saturation level. Thus even significant changes in temperature are unlikely to lead to scale deposition. In contrast when conventional DHCI is employed, the residence time of the production fluids in long tubing is so great that significant scale growth can occur and potentially impede or block the tubing. This problem is exacerbated when significant temperature variation occurs.

In preferred methods of the invention the nanoparticles comprising scale are recovered. Preferably the nanoparticles comprising scale are recovered from the hydrocarbon producing system in admixture with the production fluid, e.g. via production tubing as discussed above. In particularly preferred methods of the invention the nanoparticles comprising scale are separated from the production fluids. This can be readily achieved using a filter or by addition of a chemical that causes aggregation of the nanoparticles comprising scale. Significantly the production fluids do not comprise any scale inhibitor and do not comprise significant amounts of scale. This is a further advantage of the method of the invention since it may simplify downstream processing.

In particularly preferred methods of the invention the separated nanoparticles comprising scale are treated to remove the scale, e.g. by washing with scale dissolver such as an acid. Representative examples of suitable scale dissolver treatments include acids such as acetic acid, citric acid, hydrochloric acid, sulfuric acid, nitric acid and hydrobromic acid as well as complexing agents such as EDTA and DTPA. Especially preferably the descaled nanoparticles are reinjected into the hydrocarbon producing system. In other words the nanoparticles are recycled or reused. This represents another significant advantage of the method of the present invention compared to conventional DHCI wherein fresh scale inhibitor tends to be used.

The method of the present invention may be applied to a hydrocarbon producing system at any stage, e.g. prior to, simultaneously with and/or after the start of hydrocarbon production. The method according to the invention may also be repeated as many times as necessary. An advantage of the method of the present invention is that no preflush or overflush is required.

The method of the present invention optionally comprises the further step of identifying a hydrocarbon producing system in need of scale control.

The method of the present invention may be conducted according to any technique conventional in the art and any convenient equipment may be used to supply the composition to the hydrocarbon producing system. For instance, coil tubing may be used. Thus the composition may be introduced into a well by, for example, injection under pressures sufficient to penetrate the formation and the equipment present therein.

The present invention also relates to a system for producing hydrocarbon comprising:
(i) a hydrocarbon producing formation comprising a production well;
(ii) a chemical deployment system (e.g. an injection line) for injecting nanoparticles into said production well;
(iii) tubing (e.g. production tubing or a flowline) for transporting production fluid and nanoparticles comprising scale out of said production well; and
(iv) a means for separating nanoparticles comprising scale from production fluids having an inlet connected to said tubing and having a first outlet for nanoparticles comprising scale and a second outlet for production fluid.

In preferred systems of the present invention the means for separating nanoparticles comprising scale and production fluid is a filter. The production fluids pass through the filter whereas the nanoparticles comprising scale, as well as nanoparticles, are retained by the filter.

Further preferred systems of the invention comprise a treatment tank for removing scale from nanoparticles comprising scale. The tank has an Inlet connected to the first outlet of the moans for separating nanoparticles and an outlet for descaled nanoparticles. The tank preferably also has an inlet for treatment chemicals, e.g. acids.

Further preferred systems of the invention comprise a holding tank for descaled nanoparticles having an inlet connected to the outlet of the treatment tank and an outlet connected to the chemical deployment system for injecting nanoparticles into the production well.

DETAILED DESCRIPTION OF THE FIGURES

Figure 1A:
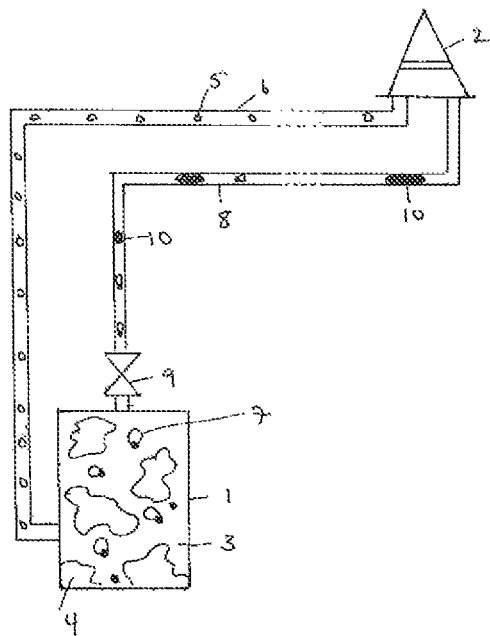
FIG. 1a shows a schematic of the prior art method of controlling scale in a hydrocarbon producing system.

Referring to FIG. 1a, it shows a cross section of a hydrocarbon producing system comprising a vertical well 1. The well 1 is located a long way (e.g. 3 to 50 km) from the production platform 2. The dashed lines in the supply lines 6, 8 described below indicate an interruption to reflect the long length of these flow lines.

The well 1 comprises hydrocarbon 3 and water 4. The hydrocarbon and water are produced together from the well and are collectively referred to as production fluid.

A scale inhibitor 5 is continuously injected into the well 1 via an Injection line 6. The scale inhibitor disperses in the well wherein it prevents scale growth on the formation walls by slowing the rate of the scale crystallisation reaction. Thus where the scale inhibitor is present in a relatively high concentration, the scale particles 7 do not grow to a significant size.

The production fluids are pumped out of the well 2 via line 8. Gas lift is used. The gas lift causes some of the fluid to evaporate and some scale precipitates as scale particles 10 from the production fluids. This may block the down hole safety valve 9.

As mentioned above the tubing from the down hole safety valve 9 to the production platform is of considerable length, e.g. up to 50 km. The residence time of the production fluid in the tubing is therefore relatively long, e.g. about 24 hours. During this time further scale growth occurs because the scale inhibitor does not prevent scale growth rather it simply slows it down. As a result, the scale particles 10 towards the end of the tubing tend to be much larger than those in the well. This can block the flow line 8.

Figure 1B:
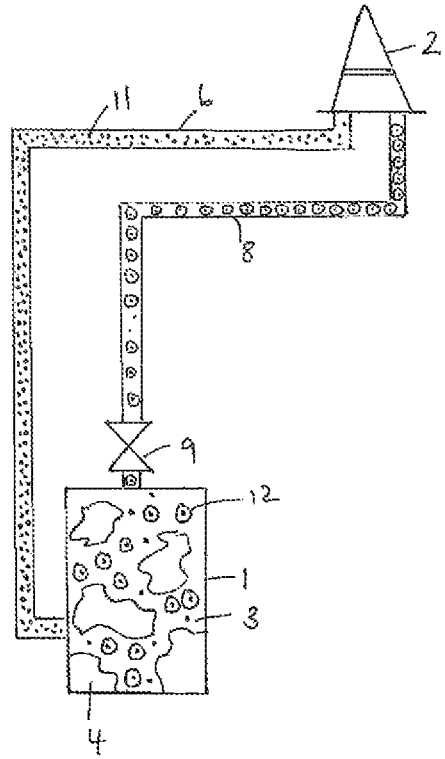
FIG. 1b shows a schematic of the method of the present invention for controlling scale in a hydrocarbon producing system.

Referring to FIG. 1b, it also shows a cross section of a hydrocarbon producing system comprising a vertical well 1. Where there are features in common with FIG. 1a, the same reference numeral is used. The main difference between FIG. 1a and FIG. 1b is that in FIG. 1b nanoparticles 11 that function as nuclei for scale growth are continuously injected into the system via injection line 6. A higher concentration of nanoparticles 10 is typically injected compared to scale inhibitor 5.

As mentioned above, the nanoparticles 11 function as nuclei for scale growth and nanoparticles comprising scale 12 are formed. The nanoparticles typically have a diameter of about 10 nm and a specific surface area of about 500 m$^2$/g. The total surface area of the nanoparticles is vast. The combination of the high concentration of nanoparticles and the vast surface area of the nanoparticles means that scale growth is much more likely to take place on the nanoparticles than on the tubing wall etc.

Significantly the very large number of nanoparticles injected into the hydrocarbon producing system also means that the formation of scale nuclei is no longer the rate determining step in the formation of scale. Thus scale growth on the nanoparticles starts quickly. The effect of scale growth occurring on the surface of the nanoparticles is that the concentration of scale forming ions in the production fluids is reduced. Typically the concentration of at least one of $Ba^{2+}$, $Sr^{2+}$, $Ca^{2+}$, $SO_4^{2-}$, and $CO_3^{2-}$ is reduced, e.g. to below the saturation level. The scaling cations, scaling anions, soluble scale and solid scale relatively rapidly reach equilibrium wherein very little, if any, solid scale exists. In other words the propensity of scale to form in the production fluid and to deposit on the formation walls and hydrocarbon producing equipment is greatly reduced. This strategy may be described as a sacrificial or vaccination method since it is based on the idea that the scaling ions are removed from the production fluids by a controlled scale reaction on the nanoparticles. Scaling is encouraged to occur on the nanoparticles to prevent scaling occurring on the hydrocarbon producing system.

The very large number of nanoparticles injected into the system also means that the size of the nanoparticles comprising scale 12 remains relatively small. Typically the size of the nanoparticles is only increased to about a maximum diameter of about 500 nm and more typically 100 nm and a length of about 1,000 nm and more typically 800 nm due to the presence of scale. This means that nanoparticles comprising scale do not impede fluid flow in the production well or cause blockages downstream.

This means that the production fluid is in a stable form and can be transported long distances (e.g. up to 50 km) without further significant scale growth occurring. The application of, for example, gas lift to the production fluid and/or different temperature conditions is much less likely to impact on the stability of the fluid, i.e. no further scale deposition is likely to occur. The method of the present invention therefore prevents or reduces damage from scale formation in the formation itself and on equipment therein by inducing scale growth to occur on nanoparticles in a controlled manner.

Figure 2:
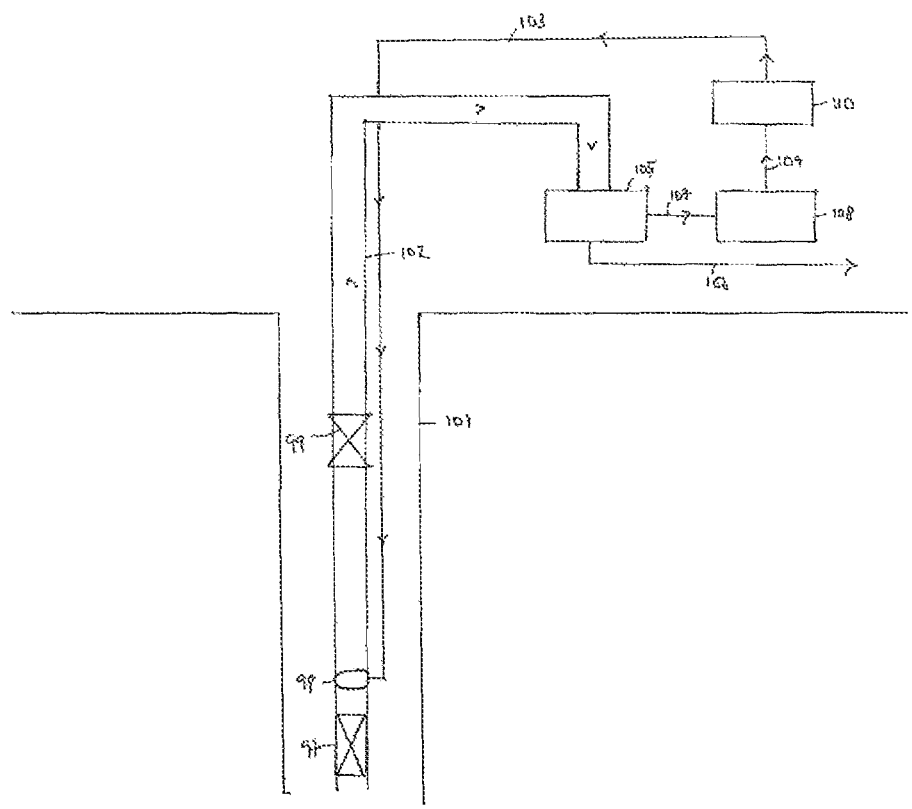
FIG. 2 shows a schematic of a method and system of the present invention.

FIG. 2 is a schematic of a hydrocarbon producing system 100 comprising a vertical production well 101. Production tubing 102 is located within the interior of the well. A downhole safety valve 99 is incorporated into tubing 102 in the upper part of the completion. A chemical deployment system, specifically injection line 103, is clamped to the outside of the production tubing 102. It is a thin capillary tube approximately 5 mm in diameter. The injection line 103 terminates at chemical injection valve 98. The chemical injection valve is placed downstream (i.e. above) a production packer 97. Both of the chemical injection valve 98 and the production packer 97 are in the lower part of the completion. The injection line 103 delivers nanoparticles to function as nuclei for scale growth.

As described above the nanoparticles collectively provide a large surface area for scale growth to occur on. Thus the majority of scale growth occurs on the surface of nanoparticles rather than on the surface of the formation or tubing or on equipment in contact with the production fluids. The nanoparticles comprising scale are produced out of the hydrocarbon producing system (as indicated by the arrow heads) along with hydrocarbon and water and are transported to filter 105. In filter 105 the nanoparticles are separated from the production fluid, i.e. hydrocarbon and water. The hydrocarbon and water are transported via line 106 for further processing. The nanoparticles comprising scale are transported via line 107 to treatment tank 108 wherein the nanoparticles are treated to remove the scale. Typically the nanoparticles are washed with hydrochloric acid. The treated nanoparticles are then transported via line 109 to tank 110 from where they can be reinjected into a hydrocarbon producing system.

The invention claimed is:

1. A method of controlling scale formation in a hydrocarbon producing system, comprising:
   (i) injecting nanoparticles via a production well into said system to function as nuclei for scale growth, wherein said nanoparticles are nanoparticles comprising carbon functionalized with a polar group;
   (ii) growing scale on said nanoparticles by attracting scaling ions to the polar group on the nanoparticle surface to produce nanoparticles comprising scale;
   (iii) recovering production fluids comprising nanoparticles comprising scale;
   (iv) washing said nanoparticles comprising scale with a scale dissolver to remove said scale; and
   (v) reinjecting the descaled nanoparticles via said production well into said hydrocarbon producing system.

2. A method as claimed in claim 1, wherein said method prevents or reduces scale formation on hydrocarbon producing equipment present in said hydrocarbon producing system.

3. A method as claimed in claim 1, wherein said nanoparticles are nanotubes.

4. A method as claimed in claim 1, wherein said nanoparticles have an average diameter of 1 to 100 nm.

5. A method as claimed in claim 1, wherein the specific surface area of said nanoparticles is 100 to 5000 m$^2$/g.

6. A method as claimed in claim 1, wherein said nanoparticles are injected continuously into said system.

7. A method as claimed in claim 1, wherein scale growth on said nanoparticles reduces the concentration of scale forming ions in a production fluid.

8. A method as claimed in claim 1, wherein the nanoparticles injected into the system reduce the concentration of scale forming ions in the production fluid to close to, or below, the saturation limit.

9. A method as claimed in claim 1, wherein said nanoparticles comprising scale have an average diameter of 10 to 1000 nm.

10. A method as claimed in claim 1, wherein said nanoparticles are applied as a dispersion in a liquid carrier.

11. A method as claimed in claim 10, wherein the concentration of nanoparticles in said liquid carrier is 0.5 to 50 wt%.

12. A method as claimed in claim 1 wherein production fluid is recovered via tubing in said production well.

13. A method as claimed in claim 1, wherein said nanoparticles comprising scale are separated from said mixture.

14. A system for producing hydrocarbon comprising:
   (i) a hydrocarbon producing formation comprising a production well;
   (ii) a chemical deployment system for injecting nanoparticles into said production well;
   (iii) tubing for transporting production fluid and nanoparticles comprising scale out of said production well;
   (iv) a filter for and/or chemical that causes aggregation for separating nanoparticles comprising scale from production fluids having an inlet connected to said tubing and having a first outlet for nanoparticles comprising scale and a second outlet for production fluid;
   (v) a treatment tank for removing scale from nanoparticles comprising scale having an inlet connected to said first outlet of said means for separating nanoparticles and an outlet for descaled nanoparticles; and
   (vi) a holding tank for descaled nanoparticles having an inlet connected to said outlet of said treatment tank and an outlet connected to said chemical deployment system for injecting nanoparticles into said production well.

15. A system as claimed in claim 14, wherein said filter for and/or chemical that causes aggregation is a filter.

* * * * *